United States Patent
Lynch et al.

(10) Patent No.: US 6,813,483 B1
(45) Date of Patent: Nov. 2, 2004

(54) METHOD AND SYSTEM FOR IMPROVING NOISE MARGIN IN A RECEIVER CIRCUIT

(75) Inventors: John Lynch, Holley, NY (US); Mark J. Kwong, Santa Clara, CA (US); M. Wesley Schrader, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 471 days.

(21) Appl. No.: 10/085,662

(22) Filed: Feb. 27, 2002

(51) Int. Cl.$^7$ ............................. H04B 1/10; H04B 1/18
(52) U.S. Cl. ................ 455/283; 455/280; 455/282; 455/67.13; 455/73; 455/296; 375/257
(58) Field of Search ............................ 455/67.11, 67.13, 455/73, 125, 280, 281, 282, 283, 115.1, 296, 332, 333, 222, 223; 379/399.02, 400, 401; 326/63, 68, 80–81; 375/257, 285, 296; 327/108, 112

(56) References Cited

U.S. PATENT DOCUMENTS

| | | | | |
|---|---|---|---|---|
| 5,826,179 A | * | 10/1998 | Lindenmeier et al. ... | 455/277.2 |
| 6,034,995 A | * | 3/2000 | Eisele et al. ................ | 375/257 |
| 6,766,155 B2 | * | 7/2004 | Salcido et al. .............. | 455/282 |
| 2001/0016475 A1 | * | 8/2001 | Tsujishita et al. ........... | 455/222 |
| 2003/0017807 A1 | * | 1/2003 | Boman et al. ................ | 455/73 |
| 2003/0139164 A1 | * | 7/2003 | Salcido et al. .............. | 455/282 |

FOREIGN PATENT DOCUMENTS

WO    WO 95/27358    * 10/1995    ........... H04L/25/06

* cited by examiner

*Primary Examiner*—Vivian Chin
*Assistant Examiner*—Tuan Tran
(74) *Attorney, Agent, or Firm*—Thelen, Reid & Priest LLP

(57) ABSTRACT

A transmitter circuit improves a noise margin for decoding a common mode signal at a receiver circuit. The transmitter circuit includes a common mode signal transmitter and a noise margin enhancement circuit coupled to a transmission line. The common mode signal transmitter transmits a control message using a common mode signal. The common mode signal has a first voltage level and a second voltage level higher than the first voltage level, and the control message corresponds to a portion of the common mode signal having the first voltage level. The noise margin enhancement circuit raises a voltage level of the common mode signal to a third voltage level higher than the second voltage level for a specific time period from a rising edge of the common mode signal from the first voltage level.

31 Claims, 5 Drawing Sheets

METHOD AND SYSTEM FOR IMPROVING NOISE MARGIN IN A RECEIVER CIRCUIT

FIELD OF THE INVENTION

The present invention relates to communications between two circuits. More particularly, the present invention relates to method and system for improving noise margin for a common mode signal in a noise-sensitive receiver circuit.

BACKGROUND OF THE INVENTION

Some bus communications architectures allow multi-speed data transfers between two or more circuits, devices, or integrated circuit (IC) chips in a computer system or transceiver system. For example, the IEEE 1394 protocol provides such a multi-speed bus architecture. Since the data can be transmitted at a different speed, a receiving circuit should be notified of the data transmission speed in order to properly receive and process the data. One solution is to send a control message specifying the data transmission speed along with transmission of the data. Such a control message is typically attached to the front end of the data transfer, and transmitted concurrently with the data signal. The control message and the data signal may be transmitted using the same communication channel (transmission line) or different channels. Typically, the data signal is conveyed by a differential voltage signal on a pair of differential transmission lines, and the control message is transmitted using a common mode voltage signal.

FIG. 1 schematically illustrates a conventional transmitter-receiver circuit system in which two circuits 10 and 12 communicate. Such circuits may be IC chips such as physical channel interface chip or "PHY" chips. The transmitter circuit 10 transmits a data signal (differential signal) and a speed signal (common mode signal) to the circuit 12 over a transmission line 14 having a pair of transmission lines 14a and 14b. In the transmitter circuit 10, the differential data signal is sent from a data transmitter 22, and the common mode signal is generated by a common mode transmitter 24. The common mode transmitter 24 pulls the current (common mode current) on the transmission lines 14a and 14b so as to change the common mode voltage level in accordance with a speed signal to be sent.

At the receiver circuit 12, the signal voltage on the transmission line 14 is input to a differential receiver 15, which extracts the differential data signal therefrom. The respective signal voltages on the transmission lines 14a and 14b are resistively added via resistors 16a and 16b, i.e., averaged to obtain the common mode signal ($V_{CM}$), which is input to a common mode receiver 18. The resistors 16a and 16b have relatively high impedance, for example, the resistance $R_1$ of 7KΩ. The transmit signal on the transmission line 14 is also resistively coupled to a bias voltage $V_B$. This resistive coupling includes low-impedance resistors 20a and 20b, for example, having resistance $R_2$ of 55Ω. The resistors 20a and 20b provide a differential termination of the transmit signal. Also, the resistive coupling via the resistor 20a and 20b provides a reference bias voltage for the common mode signal on the differential transmission lines 14a and 14b. That is, the bias voltage $V_B$ is used to set a reference voltage $V_{ref}$ in the common mode receiver 18 to decode the common mode signal.

The common mode receiver 18 includes a comparator for comparing the common mode voltage $V_{CM}$ and the reference voltage $V_{ref}$. Typically, $V_{ref}$ is set to a predetermined amount $\Delta V$ below the bias voltage $V_B$. Since the differential transmission lines 14a and 14b are biased by the bias voltage $V_B$, existence of the pulling current (i.e., the speed signal) is detected as a voltage drop in the common mode signal from the bias voltage $V_B$.

FIG. 2A schematically illustrates waveforms of the common mode signal 30 ($V_{CM}$) and the corresponding speed signal 32 (for example, speed signal S200) in a noise free environment. The speed signal S200 indicates the data speed of 200 Megabit per second (Mbps). During the time period where the common mode voltage 30 is below the reference voltage ($V_{ref}$) 34, the speed signal 32 is asserted, e.g., the speed signal 32 goes high (speed signal phase). The speed signal is then supplied to various digital logic circuits. The data signal is typically transmitted following the speed signal phase (data phase).

However, when there is some noise in the reference voltage $V_{ref}$, the level of the reference voltage $V_{ref}$ may rise above the bias voltage $V_B$. FIG. 2B schematically illustrates such a case where a bump noise 36 exists in the reference voltage 34. As shown in FIG. 2B, although the common mode voltage 30 returns to the bias voltage level at time $t_1$, the speed signal 32 is still asserted due to the bump noise 36, causing a false speed signal 38. In addition, there may be various noises on the common mode voltage 30 itself, as shown in FIG. 2C. Thus, if the reference voltage 34 becomes too close to the bias voltage level $V_B$ due to a bump noise or otherwise, such a noisy common mode voltage may also cause a false speed signal. Such a false signal would hinder proper operation of the digital logic in the receiver circuit.

Furthermore, since the reference voltage $V_{ref}$ is give as $V_B - \Delta V$, and the predetermined voltage amount $\Delta V$ (threshold voltage) is typically specified by a standard or specification, it may be not feasible to change the setting of the reference voltage level in the receiver circuit side. Accordingly, it would be desirable to provide a method and system for improving a noise margin in a noise-sensitive receiver circuit and/or a receiver circuit in a noisy environment without changing the receiver circuit configuration.

BRIEF DESCRIPTION OF THE INVENTION

A transmitter circuit improves a noise margin for decoding a common mode signal at a receiver circuit. The transmitter circuit includes a common mode signal transmitter and a noise margin enhancement circuit coupled to a transmission line. The common mode signal transmitter transmits a control message using a common mode signal. The common mode signal has a first voltage level and a second voltage level higher than the first voltage level, and the control message corresponds to a portion of the common mode signal having the first voltage level. The noise margin enhancement circuit raises a voltage level of the common mode signal to a third voltage level higher than the second voltage level for a specific time period from a rising edge of the common mode signal from the first voltage level.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and system for improving a noise margin in a receiver circuit. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 3:
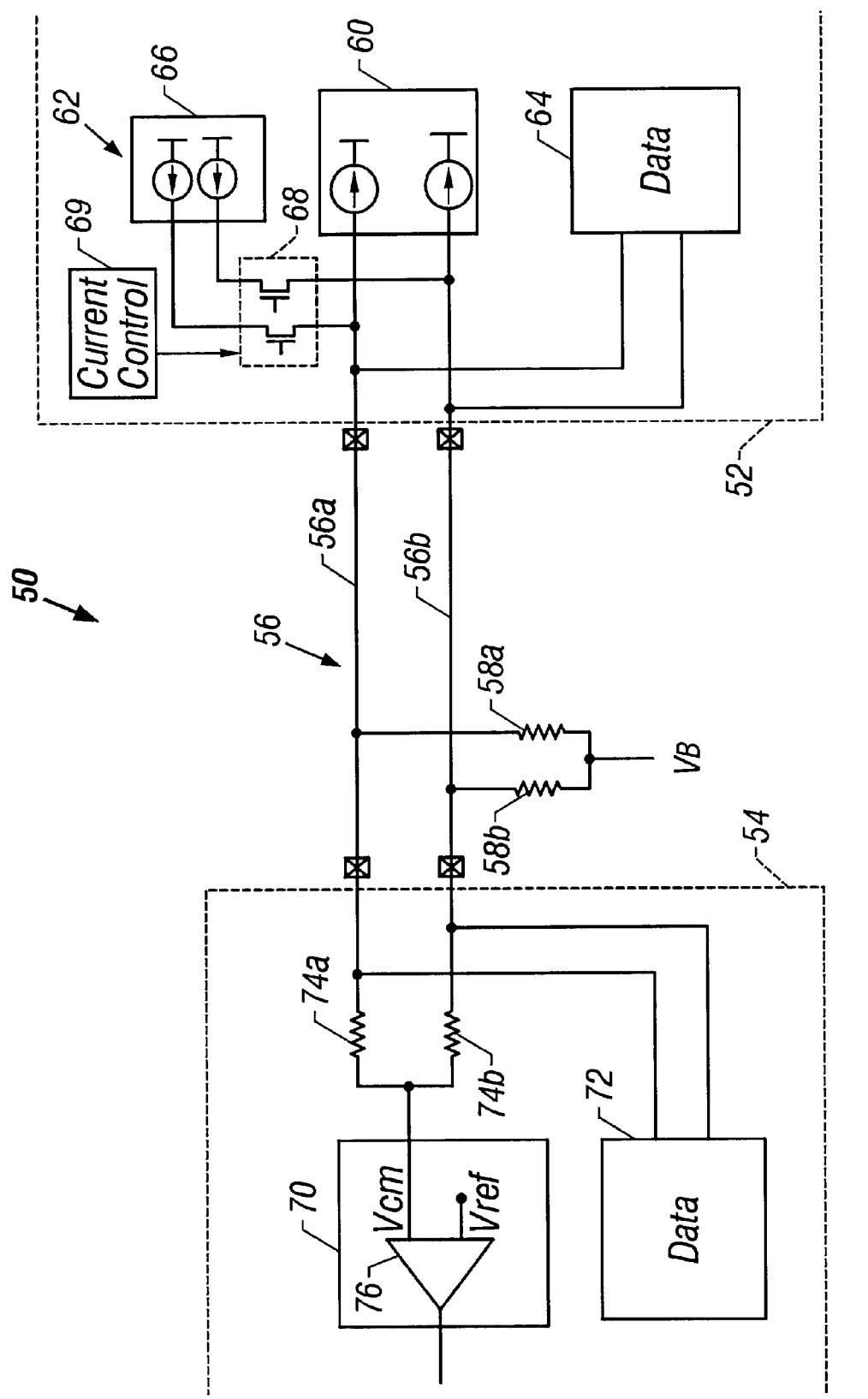
FIG. 3 is a diagram schematically illustrating a transmitter-receiver circuit system including a transmitter circuit in accordance with one embodiment of the present invention.

FIG. 3 schematically illustrates a system 50 including a transmitter circuit 52 for improving a noise margin for a common mode signal received at a receiver circuit 54, in accordance with one embodiment of the present invention. The transmitter circuit 52 and the receiver circuit 54 may be nodes, devices, or integrated circuit (IC) chips in a computer system or transceiver system. Such an IC chip may be a physical channel interface chip or "PHY" chip. The transmitter circuit 52 and the receiver circuit 54 are communicate signals via a transmission line 56, typically including a pair of differential transmission lines 56a and 56b. For example, the transmission of the common mode signal and the differential signal may comply with the IEEE 1394 protocol.

As shown in FIG. 3, the transmitter circuit 52 includes a common mode signal transmitter 60, a noise margin enhancement circuit 62, and a data signal transmitter 64. The common mode signal transmitter 60 is coupled to the transmission line 56 and transmits a control message using a common mode signal. The data signal transmitter 64 is also couple to the transmission line 56 and transmits a data signal, typically a differential data signal on the transmission lines 56a and 56b. However, the data signal is not necessarily transmitted through the same transmission line 56, but different transmission line or transmission lines may be used.

The common mode signal has at least two voltage levels: a first voltage level and a second voltage level higher than the first voltage level. The control message corresponds to a portion of the common mode signal having the first voltage level. For example, the common mode signal transmitter 60 includes a current source for supplying a pulling current (common mode current) onto the transmission line 56 so as to pull the voltage level of the common mode signal to the first voltage level. That is, the control message having a different voltage level (i.e., the first voltage level) is sent by pulling the common mode current on the transmission line 56. The control message may be a speed message indicating the data transfer rate of the data signal, for example, 200 Mbps (corresponding speed signal S200). The control message may have another voltage level indicating a different data transfer rate, for example, 400 Mbps (corresponding speed signal S400), if the system is capable of multi-speed data transmission.

The receiver circuit 54 includes a common mode receiver 70 and a data signal receiver 72. The transmitted signal voltages on the transmission lines 56a and 56b are input to the differential receiver 15. The signal voltages on the two transmission lines 56a and 56b are resistively coupled to a bias voltage $V_B$ via resistors 58a and 58b. The resistors 58a and 58b are low-impedance resistors, for example, of 55Ω, so as to provide a differential termination of the transmit signal. The transmitted signal voltages on the transmission lines 56a and 56b are also resistively added via resistors 74a and 74b and input to the common mode receiver 70 as the common mode signal ($V_{CM}$). The resistors 74a and 74b have relatively high impedance, for example, the resistance of 7KΩ. The bias voltage $V_B$ provides a reference common mode voltage to the transmission lines 56a and 56b. That is, the bias voltage $V_B$ is used to set a reference voltage $V_{ref}$ in the common mode receiver 70 to decode the common mode signal.

As shown in FIG. 3, the common mode receiver 70 includes a comparator 76 for comparing the common mode voltage $V_{CM}$ and the reference voltage $V_{ref}$. Typically, $V_{ref}$ is set to a predetermined amount ΔV below the bias voltage $V_B$. Since the transmission line 56 is biased by the bias voltage $V_B$, the control message (i.e., existence of the pulling current) is detected as a voltage drop of the common mode signal from the bias voltage $V_B$. During the time period where the common mode signal is below the reference voltage ($V_{ref}$), a corresponding control signal (for example, a speed signal) is asserted. The control signal is then supplied to various digital logic circuits which use the control signal for proper operation.

Figure 1:
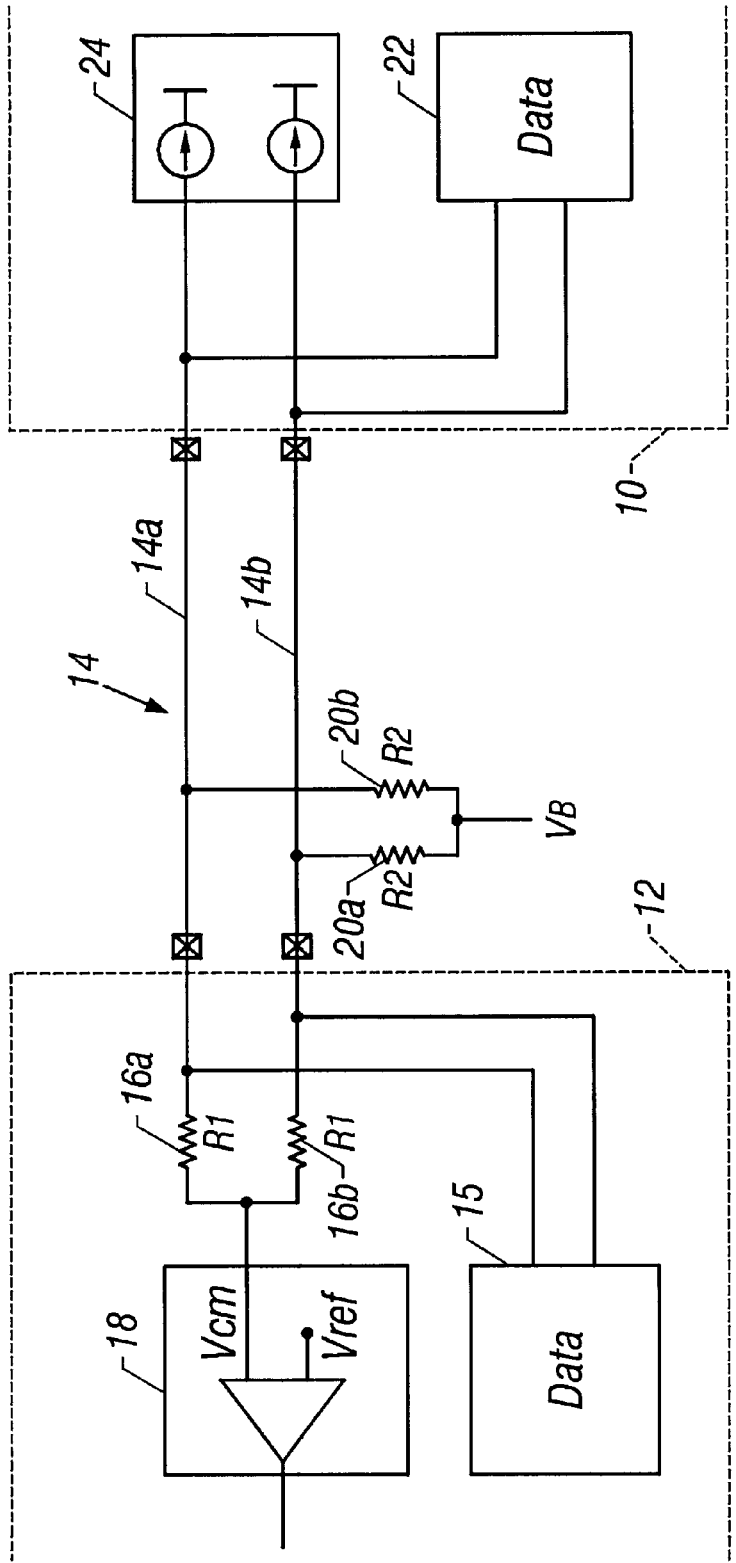
FIG. 1 is a diagram schematically illustrating conventional transmitter-receiver circuit system communicating via a transmission line.
Figure 2A:
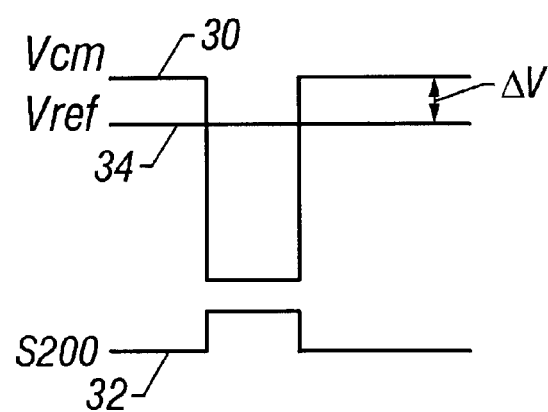
FIG. 2A is a diagram schematically illustrating waveforms of the common mode signal and the corresponding speed signal in a conventional transmitter-receiver circuit system.
Figure 2B:
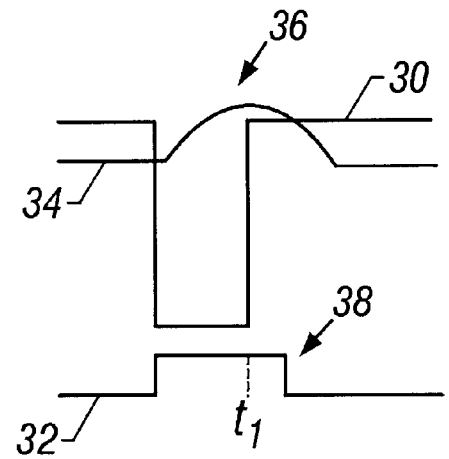
FIG. 2B is a diagram-schematically illustrating waveforms of the common mode signal and the corresponding speed signal in a conventional transmitter-receiver circuit system when a noise exists in the reference voltage.
Figure 2C:
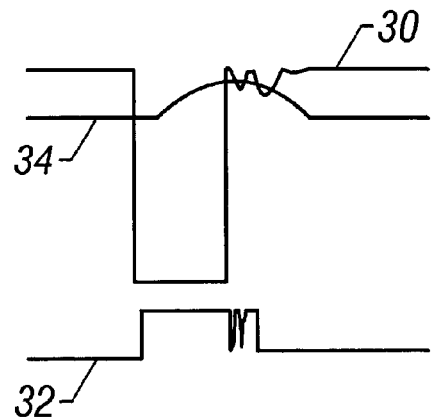
FIG. 2C is a diagram schematically illustrating waveforms of the common mode signal and the corresponding speed signal in a conventional transmitter-receiver circuit system when a noise exists in the common mode signal.

In order to prevent undesirable noise effects as shown in FIGS. 2B and 2C, the noise margin enhancement circuit 62 is provided, which is also coupled to the transmission line 56. As shown in FIG. 3, the noise margin enhancement circuit 62 may include a current source to be switched in the specific time period. For example, the noise margin enhancement circuit 62 includes a second current source 66 (such as a P-channel current source) and a switching circuit 68 (such as switching transistors). The second current source 66 supplies a reverse current onto the transmission line 56. The reverse current has a current direction opposite to the pulling current supplied by the common mode signal transmitter 60. The switching circuit 68 is coupled between the second current source 66 and the transmission line 56. The switching circuit 68 electrically connecting the second current source 66 to the transmission line 56 during the specific time period from the rising edge of the common mode signal. As shown in FIG. 3, the noise margin enhancement circuit 62 may also include a current controller 69 controlling application of the reverse current. The current controller 69 may be implemented as a state machine that asserts a reverse current control signal for the specific time period during which the switching circuit 68 is turned on.

Figure 4:
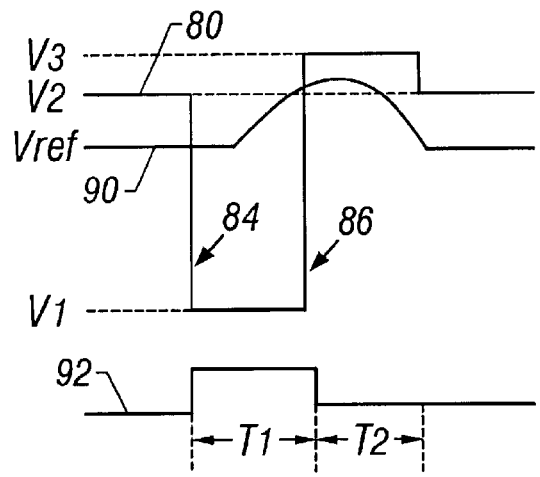
FIG. 4 is a diagram schematically illustrating waveforms of the common mode signal and the corresponding control signal in a transmitter-receiver circuit system in accordance with one embodiment of the present invention.

FIG. 4 schematically illustrates the waveform of the common mode signal ($V_{CM}$) 80 in accordance with one embodiment of the present invention. The noise margin enhancement circuit 62 (FIG. 3) raises the voltage level of the common mode signal 80 to a third voltage level ($V_3$) higher than the second voltage level ($V_2$) for a specific time period (T) from a rising edge 86 of the common mode signal from the first voltage level $V_1$. Since the control message (e.g., speed message) is corresponding to the first voltage level portion of the common mode signal 80, the corresponding control signal (e.g., speed signal) is asserted during the time period $T_1$, i.e., from the falling edge 84 to the rising edge 86 of the common mode signal 80 in the receiver circuit 54.

At the receiver circuit 54, the common mode receiver 70 decodes the control message by comparing the voltage level of the common mode signal 80 with the reference voltage level 90. The reference voltage ($V_{ref}$) is set between the first voltage level $V_1$ and the second voltage level $V_2$. The reference voltage $V_{ref}$ is typically a predetermined amount $\Delta V$ below the bias voltage $V_B$, i.e., $V_{ref}=V_B-\Delta V$, and the reference voltage level 90 ideally remains constant. The control signal 92 is asserted when the voltage level of the common mode signal 80 is lower than the reference voltage level 90. Since the voltage level of the common mode signal 80 is raised at the end of the control message, i.e., at the raising edge 86 of the common mode signal 80, even when the reference voltage level 90 has a variation due to a noise, the common mode signal 80 (having the third voltage level $V_3$) still remains higher than the reference voltage level 90. This makes it sure that the speed signal 92 is correctly asserted the proper time period $T_1$, preventing a false control signal as shown in FIG. 2B in the conventional system. In addition, by raising the common mode signal level higher than the second voltage level $V_2$, when the common mode signal 80 itself has some noise thereon, the common mode signal 80 still remains higher than the reference voltage 90.

The specific time period $T_2$ during which the common mode signal 80 is having the third voltage level may be the duration of a data transmission phase transmitting the data signal, which typically follows the control message phase transmitting the control message. For example, in data transmission in accordance with the IEEE 1394 protocol, the current controller 69 (FIG. 3) asserts the reverse current control signal so as to control the reverse current as described below.

The IEEE 1394 supports daisy chaining and peer-to-peer connections of nodes. An IEEE 1394 bus cable typically includes two twisted pairs and a pair of power wires. A first twisted pair, which is conventionally referred to as $T_pA$, provides bi-directional non-return-to-zero data. A second twisted pair, which is conventionally referred to as $T_pB$, provides a strobe signal accompanying the data signal. Differential signaling is used to detect line state of the bus by driving steady state line voltage from the opposite ends of the two pairs of twisted wire. At each end of the bus, data/strobe signaling is used to drive respective line state voltages on the first and second twisted pairs. The combination of the two line state voltages represent a particular line state at each end of the bus.

Figure 5:
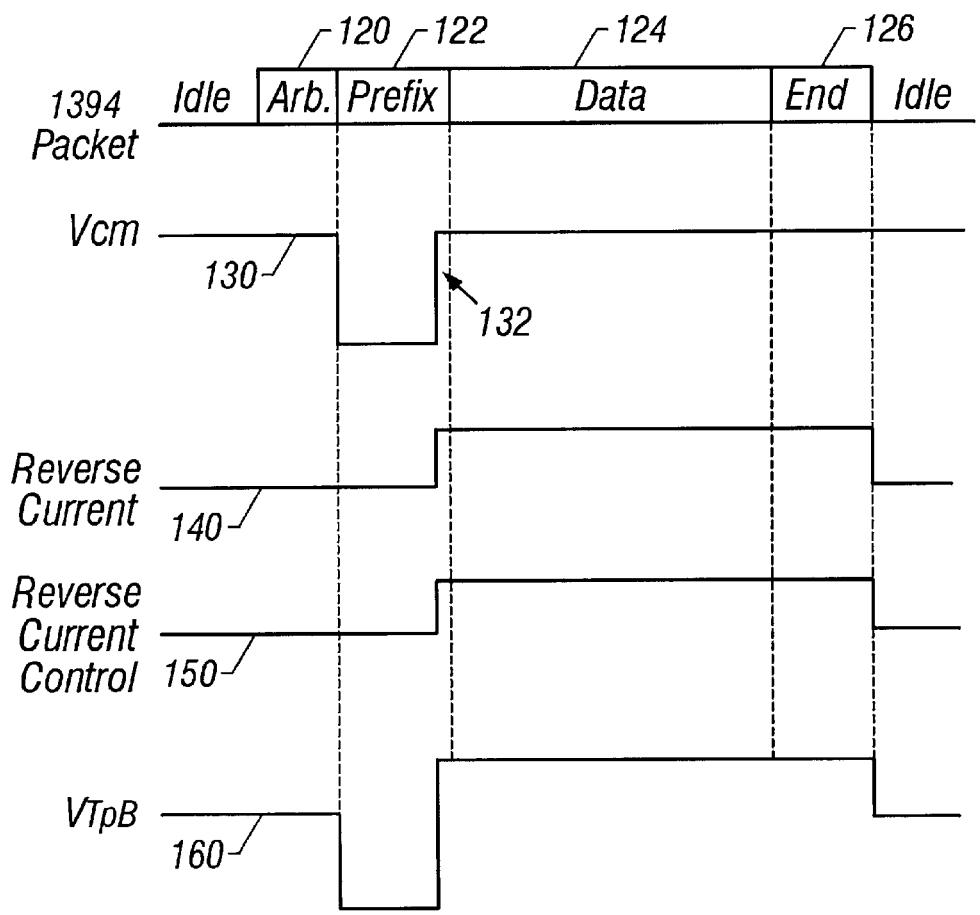
FIG. 5 is a diagram schematically illustrating packet transmitting phases over the IEEE 1394 protocol and waveforms of the signals in accordance with one embodiment of the present invention.

As shown in FIG. 5, a packet transmission over the IEEE 1394 protocol can be considered to have four phases: arbitration phase 120, data prefix phase 122, data phase 124, and data end phase 126. In the arbitration phase 120, ownership of the bus is determined by arbitration signaling using a set of such steady state combinations. After winning arbitration, the node (transmitter-side) begins transmission by moving on to the next phase. During the data prefix phase 122, the two twisted pairs are held at a constant state differentially which signals the start of a packet transmission to the other node (receiver-side) attached to the bus. A common mode voltage shift is applied to one set of twisted pair to signal the speed of the packet being transmitted (i.e., the control message). This voltage shift lowers the common mode voltage ($V_{CM}$) 130 by a given amount depending on the speed of the packet that is transmitted, as shown in FIGS. 5 and 2A. The common mode voltage 130 is brought back up to the normal level before this phase ends. In the data phase 124, the data to be transmitted is signaled during this phase. In the data end phase 126, the two twisted pairs are held at a constant state differentially which signals the end of a packet transmission to the other nodes attached to the bus.

The reverse current control signal 140 for this reverse current is asserted after the rising edge 132 of the speed signal (during the data prefix phase). This turns on the reverse current 140. The revere current is held on until the completion of the data end phase 126. At that time, the control signal is deasserted and the current is turned off. The waveform 160 illustrates the common mode signal voltage $V_{TpB}$ received at the other node. This reverse current may be turned on for a specific speed signal among a plurality of speed signals (for example, S100, S200, and S400) transmitted via the bus. The reverse current may only be turned on for a speed signal that are transmitting during the prefix (or transmit) phase following the normal arbitration phase of bus activity.

Figure 6:
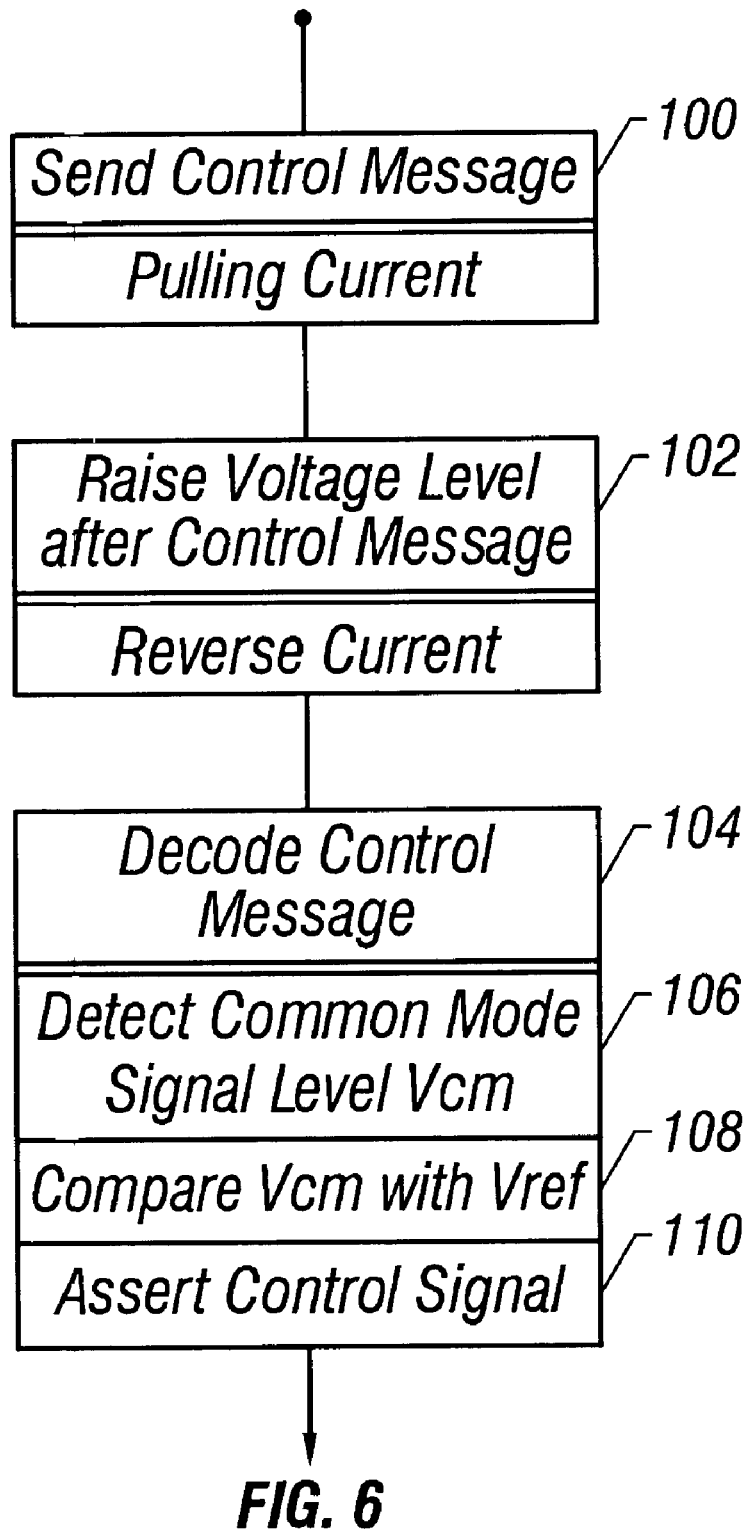
FIG. 6 is a process flow diagram schematically illustrating a method for improving a noise margin for decoding a common mode signal received at a receiver circuit, in accordance with one embodiment of the present invention.

FIG. 6 schematically illustrates a process flow of a method for improving a noise margin for decoding a common mode signal received at a receiver circuit, in accordance with one embodiment of the present invention. A control message is transmitted to the receiver circuit using a common mode signal via a transmission line (100). The common mode signal has a first voltage level and a second voltage level higher than the first voltage level, and the control message corresponds to a portion of the common mode signal having the first voltage level. The voltage level of the common mode signal is raised to a third voltage level higher than the second voltage level at the end of the control message (102). That is, the voltage of the common mode signal is raised at its rising edge from the first voltage level, and the higher voltage level is maintained for a specific time period. At the receiver circuit, the control message is decoded based on the voltage level of the common mode signal so as to generate a control signal (104).

Transmitting the common mode signal (100) may include supplying a pulling current onto the transmission line, thereby pulling the voltage level of the common mode signal to the first voltage level. Raising the level of the common mode signal to the third level (102) may include supplying a reverse current onto the transmission line for the specific time period. The reverse current has a current direction opposite to the pulling current. In decoding the common mode signal at the receiver circuit (104), the voltage level of the common mode signal is first detected (106), the detected voltage level is compared with a reference voltage level (108), and the control signal is asserted when the detected voltage level is lower than the reference voltage level (110). The reference voltage level is set between the first voltage level and the second voltage level, and typically a predetermined voltage (threshold voltage) below the second voltage level.

As described above, a higher voltage level of the common mode signal is generated by the transmitter circuit at the end of the control message (at the rising edge of the common mode signal), so that the noise margin ($V_{CM}-V_{ref}$) for detecting the control message is effectively enhanced in the receiver circuit. The required current capability of the current source for the noise margin enhancement circuit depends on the amount of anticipated noises. However, the additional current source is typically small compared with the current source for the common mode signal transmitter. The noise margin enhancement will be done within the IEEE 1394 specification. However, the present invention is not limited to the specific standard, but is generally applicable to data transmission to a noise sensitive receiver circuit and/or data transmission in a noisy environment. The noise margin enhancement in a receiver circuit is achieved without changing the receiver circuit structure.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for improving a noise margin for decoding a common mode signal received at a receiver circuit, said method comprising:

transmitting a control message to the receiver circuit using a common mode signal, the common mode signal having a first voltage level and a second voltage level higher than the first voltage level, the control message corresponding to a portion of the common mode signal having the first voltage level;

raising a voltage level of the common mode signal to a third voltage level higher than the second voltage level for a specific time period from a rising edge of the common mode signal from the first voltage level; and decoding at the receiver circuit said control message based on the voltage level of the common mode signal so as to generate a control signal.

2. A method according to claim 1, wherein said transmitting includes:

supplying a pulling current onto a transmission line transmitting the common mode signal, thereby pulling the voltage level of the common mode signal to the first voltage level.

3. A method according to claim 2, wherein said raising includes:

supplying a reverse current onto the transmission line for the specific time period, the reverse current having a current direction opposite to said pulling current.

4. A method according to claim 1, wherein said decoding includes:

detecting a voltage level of the common mode signal at the receiver circuit;

comparing the detected voltage level with a reference voltage level, the reference voltage level being set between the first voltage level and the second voltage level; and asserting the control signal when the voltage level of the common mode signal is lower than the reference voltage level.

5. A method according to claim 4, wherein the third voltage level remains higher than the reference voltage level when the reference voltage level has a variation due to a noise.

6. A method according to claim 4, wherein the third voltage level remains higher than the reference voltage level when the common mode signal has a voltage level variation due to a noise.

7. A method according to claim 1, further comprising:

transmitting data to the receiver circuit using a differential signal.

8. A method according to claim 7, wherein the control message includes a speed message indicating a data transmission rate.

9. A method according to claim 8, wherein the data is transmitted in a data transmission phase following the transmission of said speed message.

10. A method according to claim 9, wherein the specific time period is duration of the data transmission phase.

11. A method according to claim 7, wherein the transmission of the common mode signal and the differential signal complies the IEEE 1394 protocol.

12. A transmitter circuit for improving a noise margin for decoding a common mode signal received at a receiver circuit, said transmitter circuit comprises:

a common mode signal transmitter coupled to a transmission line, for transmitting a control message using a common mode signal, the common mode signal having a first voltage level and a second voltage level higher than the first voltage level, the control message corresponding to a portion of the common mode signal having the first voltage level; and a noise margin enhancement circuit coupled to the transmission line, said noise margin enhancement circuit raising a voltage level of the common mode signal to a third voltage level higher than the second voltage level for a specific time period from a rising edge of the common mode signal from the first voltage level.

13. A transmitter circuit according to claim 12, wherein said common mode signal transmitter includes:

a first current source for supplying a pulling current onto the transmission line so as to pull the voltage level of the common mode signal to the first voltage level.

14. A transmitter circuit according to claim 13, wherein said noise margin enhancement circuit includes:

a second current source for supplying a reverse current onto the transmission line, the reverse current having a current direction opposite to the pulling current; and a switching circuit coupled between said second current source and the transmission line, said switching circuit electrically connecting said second current source to the transmission line during the specific time period from the rising edge of the common mode signal.

15. A transmitter circuit according to claim 12, wherein when the receiver circuit decodes the control message by comparing a voltage level of the common mode signal with a reference voltage level set between the first voltage level and the second voltage level, the third voltage level remaining higher than the reference voltage level when the reference level has a variation due to a noise.

16. A transmitter circuit according to claim 12, wherein the receiver circuit decodes the control message by comparing a voltage level of the common mode signal with a reference voltage level set between the first voltage level and the second voltage level, the third voltage level remaining higher than the reference voltage level when the common mode signal has a voltage level variation due to a noise.

17. A transmitter circuit according to claim 12, further comprising:
  a data transmitter coupled to the transmission line, said data transmitter transmitting data using a differential signal.

18. A transmitter circuit according to claim 17, wherein the control message indicates a data transmission rate.

19. A transmitter circuit according to claim 18, wherein said data transmitter transmits the data in a data transmission phase following transmission of the control message.

20. A transmitter circuit according to claim 19, wherein the specific time period is duration of the data transmission phase.

21. A transmitter circuit according to claim 17, wherein transmission of the common mode signal and the differential signal complies with the IEEE 1394 protocol.

22. An apparatus for improving a noise margin for decoding a common mode signal received at a receiver circuit, said apparatus comprising:
  means for transmitting a control message to the receiver circuit using a common mode signal, the common mode signal having a first voltage level and a second voltage level higher than the first voltage level, the control message corresponding to a portion of the common mode signal having the first voltage level; and
  means for raising a voltage level of said common mode signal to a third voltage level higher than the second voltage level for a specific time period from a rising edge of the common mode signal from the first voltage level.

23. An apparatus according to claim 22, wherein said means for transmitting includes:
  means for supplying a pulling current onto a transmission line transmitting the common mode signal, thereby pulling the voltage level of the common mode signal to the first voltage level.

24. An apparatus according to claim 23, wherein said means for raising includes:
  means for supplying a reverse current onto the transmission line for the specific time period, the reverse current having a current direction opposite to the pulling current.

25. An apparatus according to claim 22, wherein the receiver circuit detects the control message by comparing a voltage level of the common mode signal with a reference voltage level set between the first voltage level and the second voltage level,
  and wherein the third voltage level remains higher than the reference voltage level when the reference voltage level has a variation due to a noise.

26. An apparatus according to claim 22, wherein the receiver circuit detects the control message by comparing a voltage level of the common mode signal with a reference voltage level set between the first voltage level and the second voltage level,
  and wherein the third voltage level remains higher than the reference voltage level when the common mode signal has a voltage level variation due to a noise.

27. An apparatus according to claim 22, further comprising:
  means for transmitting data to the receiver circuit using a differential signal.

28. An apparatus according to claim 27, wherein the control message includes a speed message indicating a data transmission rate.

29. An apparatus according to claim 28, wherein the data is transmitted in a data transmission phase following the transmission of the speed message.

30. An apparatus according to claim 29, wherein the specific time period is duration of the data transmission phase.

31. An apparatus according to claim 27, wherein transmission of the common mode signal and the differential signal complies the IEEE 1394 protocol.

* * * * *